United States Patent
Furuskär et al.

(10) Patent No.: US 9,509,468 B2
(45) Date of Patent: Nov. 29, 2016

(54) METHODS AND ARRANGEMENTS FOR TRANSMITTING AND RECEIVING SUB-FRAME SPECIFIC POWER OFFSET INFORMATION

(75) Inventors: Anders Furuskär, Stockholm (SE); Lars Lindbom, Karlstad (SE); Stefan Parkvall, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 83 days.

(21) Appl. No.: 14/115,913

(22) PCT Filed: May 9, 2011

(86) PCT No.: PCT/SE2011/050583
§ 371 (c)(1),
(2), (4) Date: Nov. 6, 2013

(87) PCT Pub. No.: WO2012/154094
PCT Pub. Date: Nov. 15, 2012

(65) Prior Publication Data
US 2014/0086203 A1 Mar. 27, 2014

(51) Int. Cl.
*H04L 5/00* (2006.01)
*H04W 52/14* (2009.01)
*H04W 52/24* (2009.01)
(Continued)

(52) U.S. Cl.
CPC .......... *H04L 5/0048* (2013.01); *H04W 52/143* (2013.01); *H04W 52/244* (2013.01); *H04W 52/343* (2013.01); *H04W 52/36* (2013.01)

(58) Field of Classification Search
None
See application file for complete search history.

(56) References Cited

U.S. PATENT DOCUMENTS

2009/0286562 A1* 11/2009 Gorokhov ............ H04B 7/0617
455/501
2010/0246561 A1* 9/2010 Shin et al. ..................... 370/345
(Continued)

FOREIGN PATENT DOCUMENTS

WO 0176098 A2 10/2001
WO 2007042898 A1 4/2007

OTHER PUBLICATIONS

Unknown, Author, "3GPP TS 36.213, V12.0.0 (Dec. 2013)", 3rd Generation Partnership Project; Technical Specification Group Radio Access Network; Evolved Universal Terrestrial Radio Access (E-UTRA); Physical layer procedures (Release 12), Dec. 2013, pp. 1-186.
(Continued)

*Primary Examiner* — Fan Ng
(74) *Attorney, Agent, or Firm* — Murphy, Bilak & Homiller, PLLC

(57) ABSTRACT

In one embodiment, a method in a network node is provided. The network node is configured to use a first power level for transmitting data in subframes of a first type, and to use a second power level for transmitting data in subframes of a second type. The method comprises signaling (520) first and second information to a network entity. From the first information, a power offset for subframes of the first type is derivable. The first power offset represents a relation between a power level for transmitting reference signals and the first power level. From the second information, a power offset for subframes of the second type is derivable. The second power offset represents a relation between the power level for transmitting reference signals, and the second power level.

14 Claims, 8 Drawing Sheets

(51) Int. Cl.
H04W 52/34 (2009.01)
H04W 52/36 (2009.01)

(56) References Cited

U.S. PATENT DOCUMENTS

2011/0098054 A1* 4/2011 Gorokhov et al. ........ 455/452.1
2011/0235582 A1* 9/2011 Chen et al. .................. 370/328

OTHER PUBLICATIONS

Unknown, Author, "3GPP TS 36.300, V12.0.0 (Dec. 2013)", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Dec. 2013, pp. 1-208.

Unknown, Author, "3GPP TS 36.331, V10.1.0 (Mar. 2011)", 3rd Generation Partnership Project; Technical Specification Group Radio Access Network; Evolved Universal Terrestrial Radio Access (E-UTRA); Radio Resource Control (RRC); Protocol specification (Release 10), Mar. 2011, pp. 1-290.

Unknown, Author, "3GPP TS 36.331, V12.0.0 (Dec. 2013)", 3rd Generation Partnership Project; Technical Specification Group Radio Access Network; Evolved Universal Terrestrial Radio Access (E-UTRA); Radio Resource Control (RRC); Protocol specification (Release 12), Dec. 2013, pp. 1-349.

Author Unknown, "Miscellaneous corrections (related to review in preparation for ASN.1 freeze)," Rapporteur (Samsung); 3GPP TSG-RAN2 Meeting #73 bis; R2-112543; Apr. 11-15, 2011. pp. 1-291.

3rd Generation Partnership Project, "3GPP TS 36.300 V10.3.0 (Mar. 2011)," 3rd Generation Partnership Project; Technical Specification Group Radio Access Network; Evolved Universal Terrestrial Radio Acess (E-UTRA) and Evolved Universal Terrestrial Radio Access Network (E-UTRAN); Overall description; Stage 2 (Release 10). Mar. 2011. pp. 1-197.

\* cited by examiner

Datarate distributions for a fixed offered traffic load with zero and non-zero ABS power.

Mean and cell-edge datarate v traffic load with zero and non-zero ABS power.

METHODS AND ARRANGEMENTS FOR TRANSMITTING AND RECEIVING SUB-FRAME SPECIFIC POWER OFFSET INFORMATION

TECHNICAL FIELD

The present invention relates generally to a method and an arrangement in a network, and to a method and an arrangement in a wireless terminal. In particular, it relates to transmission and reception of information related to power offsets for subframes of different types.

BACKGROUND

The 3rd Generation Partnership Project (3GPP) is responsible for the standardization of the Universal Mobile Telecommunication System (UMTS) and Long Term Evolution (LTE). The 3GPP work on LTE is also referred to as Evolved Universal Terrestrial Access Network (E-UTRAN). LTE is a technology for realizing high-speed packet-based communication that can reach high data rates both in the downlink and in the uplink, and is thought of as a next generation mobile communication system relative to UMTS.

In LTE, OFDM (Orthogonal Frequency Division Multiplexing) is used in the downlink. The LTE physical resource can be seen as a time-frequency grid, where each resource element, i.e. each square in the grid, corresponds to one OFDM subcarrier during one OFDM symbol interval. An LTE downlink subframe comprising 14 OFDM symbols, with 3 OFDM symbols as control region, is illustrated in FIG. 2a. The control region comprises e.g. the Physical Downlink Control Channel (PDCCH), on which control information such as downlink scheduling assignments and uplink scheduling grants are transmitted. In the data region, data is transmitted on the Physical Downlink Shared Channel (PDSCH). Some of the resource elements within the time-frequency grid are used to transmit reference symbols (RS), which are known symbols which may e.g. be used by the receiver for channel estimation in order to perform coherent demodulation.

There is an ever increasing demand for higher data rates in cellular networks, which poses challenges to developers of such wireless networks. One approach to meeting requirements for higher data rates is to deploy heterogeneous networks, i.e. a network containing base stations with different transmission power. Base stations operating with high transmission power are herein denoted macro base stations, and base stations operating with lower transmission power are denoted low power nodes (LPN), but may also be referred to by other terms such as micro, pico, or femto base stations. The LPNs may further be stand-alone base stations, relays, or remote radio units.

Cell selection by wireless terminals is typically based on downlink (DL) received power, including the effects of the different base station transmission power. This leads to an 'imbalance area' surrounding the low power node where the path loss is lower towards the low power node, but the macro base station is still selected due to its higher transmission power. In the uplink (UL) direction, where the transmit power is the same, it would be better for a wireless terminal to be connected to the low power node also in this area. By increasing transmission power of the lower power node, the cell size of low power nodes can be increased. However, doing so affects the cost and size of the node, which in turn limits site availability. The range of the low power node can also be increased using a cell selection offset that favors the selection of the low power node. This leads to the UL being received in the best node, i.e. the low power node, and offloads the macro to a greater extent. These benefits, however, come at the cost of higher DL interference for users on the edge of the low power node cell. To mitigate this interference, the interfering macro base stations can be silenced. This is supported in LTE release 10 through so called Almost Blank Subframes (ABS). 3GPP Technical Report 36.300, version 10.3.0, section 16.1.5 defines ABS in the following way: "Almost blank subframes are subframes with reduced transmit power (including no transmission) on some physical channels and/or reduced activity. The eNB ensures backwards compatibility towards UEs by transmitting necessary control channels and physical signals as well as System Information."

SUMMARY

An object of the invention is to enable transmission of Almost Blank Subframes (ABS) without significantly degrading system performance, e.g. throughput, in the macro layer.

In some embodiments, a method in a network node is provided. The network node is configured to use a first power level for transmitting data in subframes of a first type, and to use a second power level for transmitting data in subframes of a second type. The network signals, to a network entity, first information from which a power offset for subframes of the first type is derivable, and signals second information from which a power offset for subframes of the second type is derivable. The first power offset represents a relation between a power level for transmitting reference signals and the first power level, and the second power offset represents a relation between the power level for transmitting reference signals, and the second power level. In particular embodiments, the network entity may be a wireless terminal, or a base station.

In some embodiments, a method in a wireless terminal is provided. The wireless terminal is connected to a network node, and the network node is configured to use a first power level for transmitting data in subframes of a first type, and to use a second power level for transmitting data in subframes of a second type. The wireless terminal receives, from the network node, first information from which a power offset for subframes of the first type is derivable, and second information from which a power offset for subframes of the second type is derivable. The first power offset represents a relation between a power level used by the network node for transmitting reference signals and the first power level, and the second power offset represents a relation between the power level used by the network node for transmitting reference signals, and the second power level.

In some embodiments, a network node is provided, which is configured to use a first power level for transmitting data in subframes of a first type, and to use a second power level for transmitting data in subframes of a second type. The network node may be an evolved NodeB, eNB. The network node comprises a transmitter, a receiver, and a processing circuit. The processing circuit is configured to signal, to a network entity connected to the network node, first information from which a power offset for subframes of the first type is derivable, and second information from which a power offset for subframes of the second type is derivable. The first power offset represents a relation between a power level for transmitting reference signals and the first power level, and the second power offset represents a relation between the power level for transmitting reference signals, and the second power level. In particular embodiments, the network entity may be a wireless terminal, or a base station.

In some embodiments, a wireless terminal is provided. The wireless terminal is connectable to a network node, which is configured to use a first power level for transmitting data in subframes of a first type, and to use a second power level for transmitting data in subframes of a second type. The wireless terminal, which may be a user equipment (UE), comprises a receiver and a processing circuit. The processing circuit is configured to receive, from the network node, first information from which a power offset for subframes of the first type is derivable, and second information from which a power offset for subframes of the second type is derivable. The first power offset represents a relation between a power level used by the network node for transmitting reference signals and the first power level, and the second power offset represents a relation between the power level used by the network node for transmitting reference signals, and the second power level.

By signaling information from which different power offsets for different subframe types can be derived, particular embodiments enable transmission of Almost Blank Subframes with reduced power on data elements, rather than zero-power transmission. Thus, some data may be transmitted even in Almost Blank Subframes. Thereby, an increased user data rate and system capacity may be achieved compared to transmitting with zero power.

DETAILED DESCRIPTION

Figure 1:
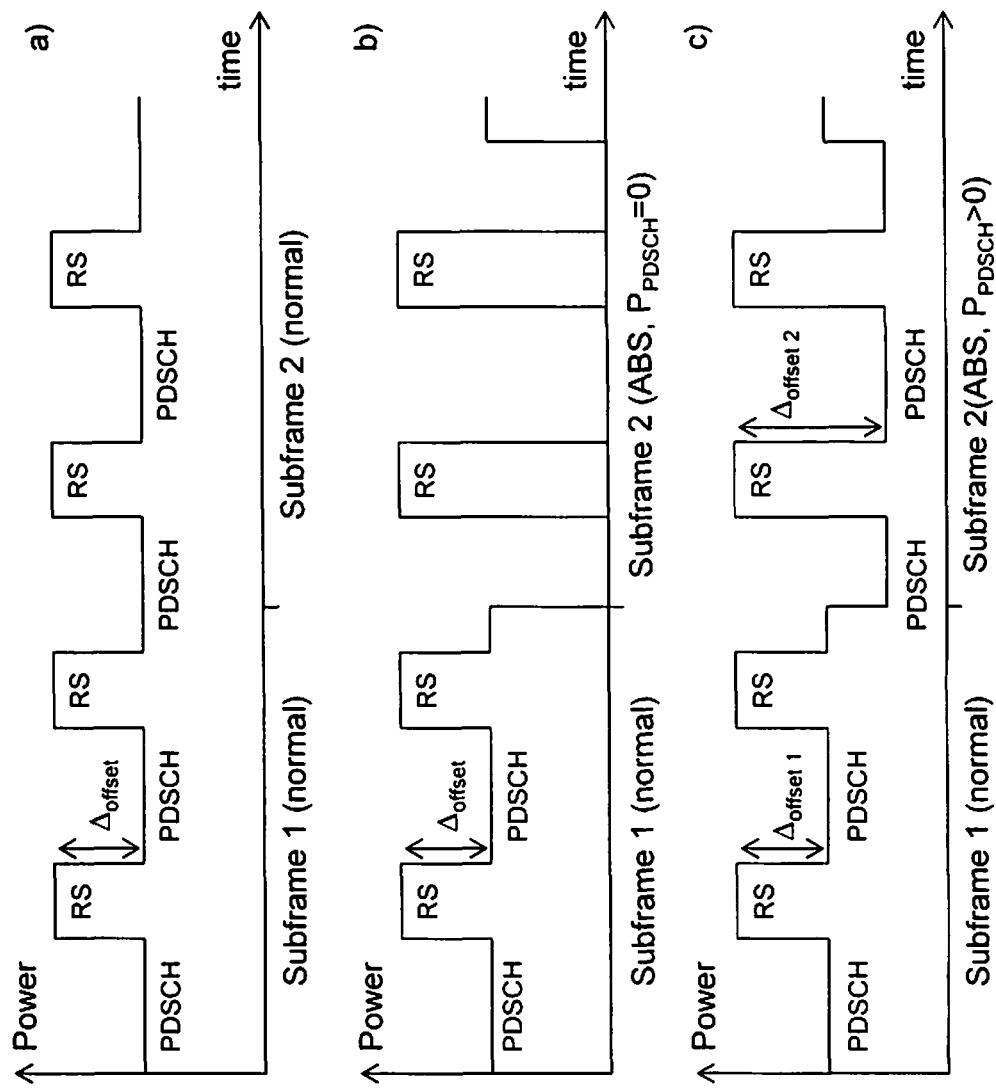
FIG. 1 is a schematic diagram illustrating power offsets between reference symbol and data transmission.

As discussed above, Almost Blank Subframes (ABS) may be used by a network node, such as a macro base station, in order to temporarily reduce interference towards another node, e.g. a low power node or micro/pico base station. This makes it possible for the low power node to use larger cell selection offsets. Currently, there is a general understanding that the network node shall use zero power, i.e. "no transmission", on data elements in Almost Blank Subframes. FIG. 1 shows Reference Signal (RS) and PDSCH power over time for a) two normal subframes, b) a normal subframe and an Almost Blank Subframe (ABS) with $P_{PDSCH}=0$. A drawback of this approach, where the LTE downlink data channel (PDSCH) in the macro base station is completely switched off, is that performance for users connected to the macro base station degrades. The reduced transmission time directly leads to lower data rates, which indirectly also lead to increased load, i.e. higher resource utilization, for the same amount of carried traffic.

This effect may be mitigated by not completely switching off the macro PDSCH in the ABS subframes, but rather reduce the power to a level that the pico users can support. The inventors have found that transmission with reduced power may bring about significant performance improvements.

Figure 2:
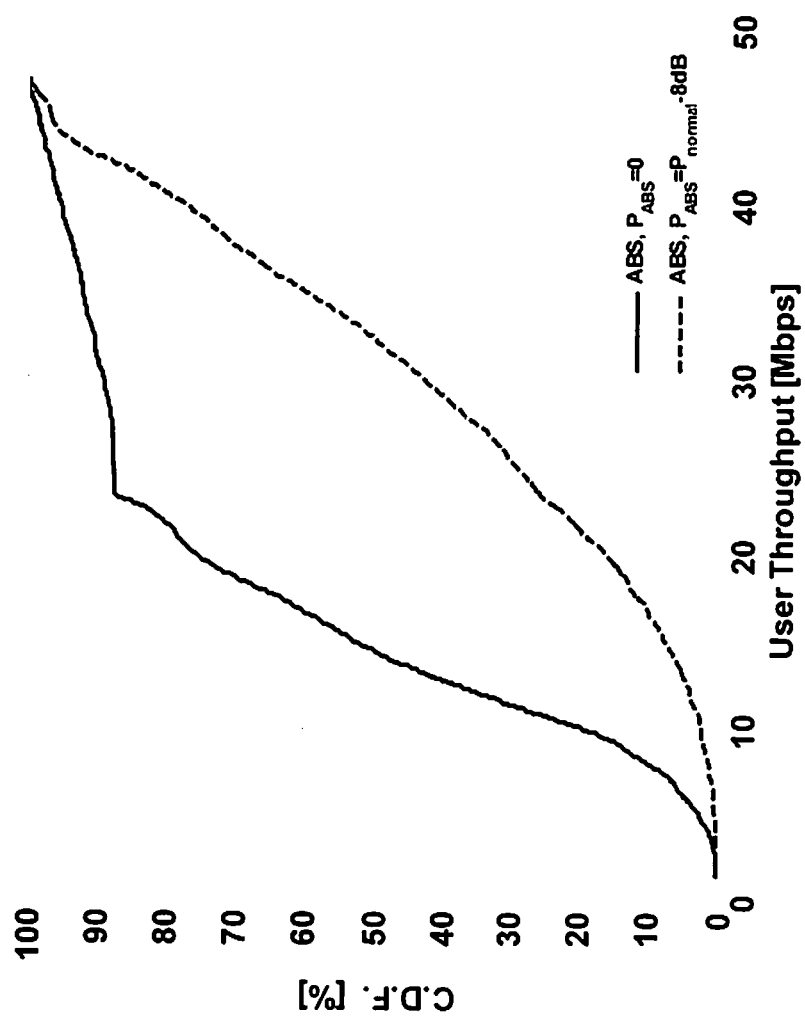
FIGS. 2-3 are diagrams comparing the performance of different system configurations.
Figure 2A:
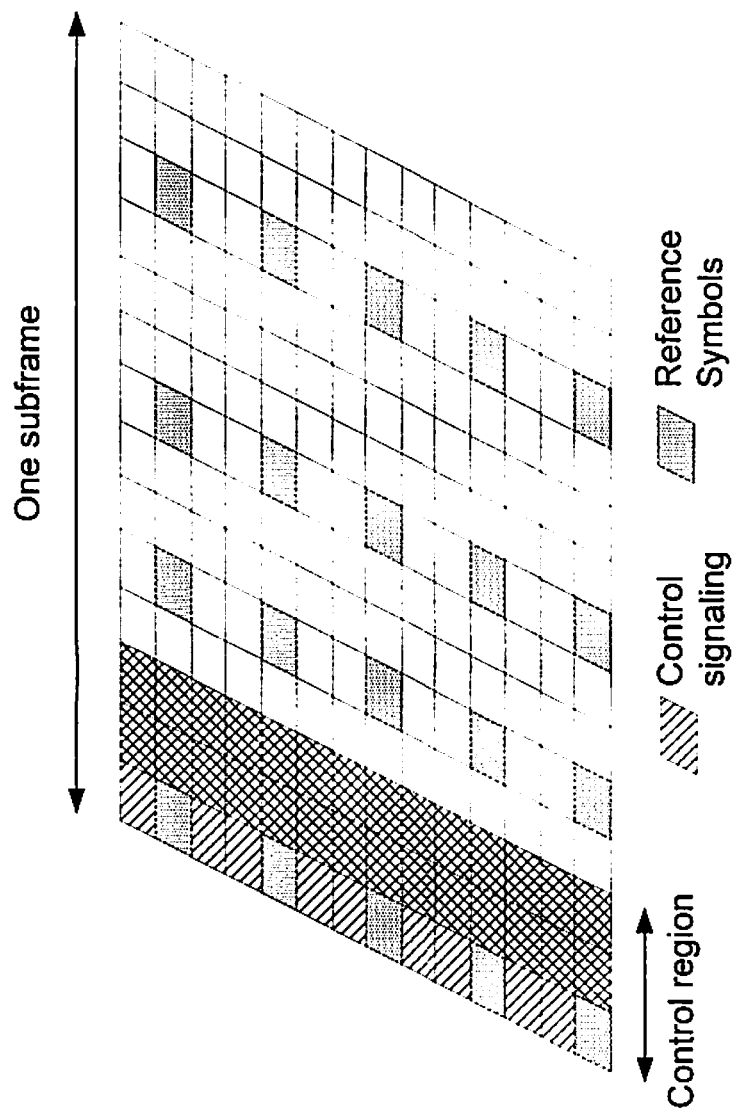
FIG. 2a is a schematic diagram illustrating a subframe in LTE.

FIG. 2 shows data rate distributions for a fixed offered traffic load. It is seen that with a non-zero ABS power, significantly higher data rates are achieved. This is due to the macro user being able to be active in all subframes rather than in half of them.

Figure 3:
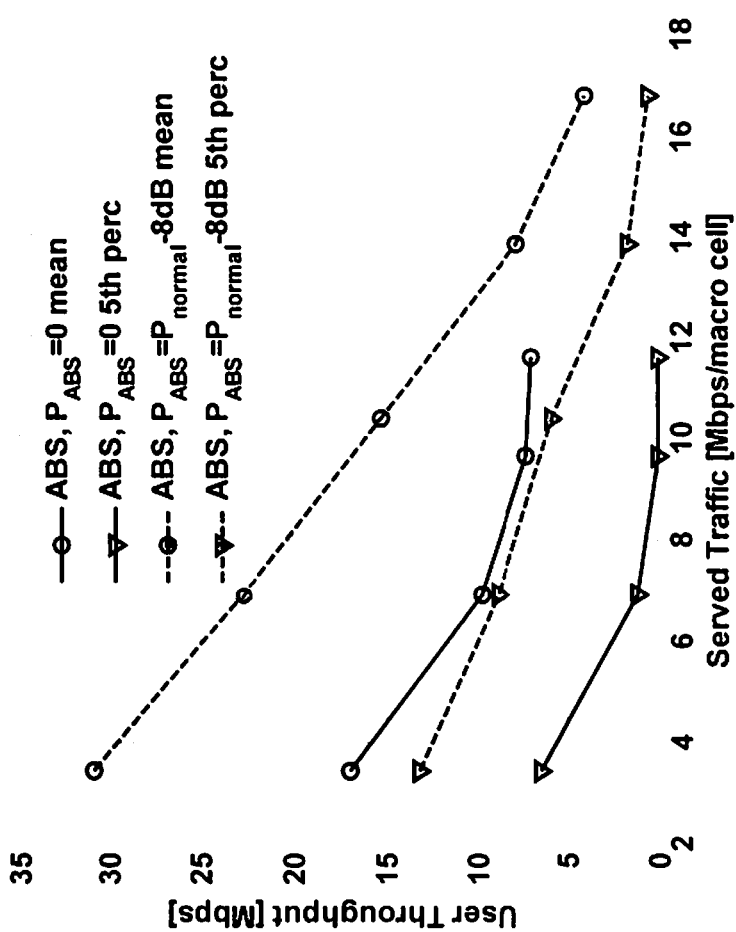

FIG. 3 shows mean and cell-edge (5th percentile) data rates as a function of served traffic (normalized per macro cell). It is seen that significant data rate and capacity improvements are achieved, and thus, ABS with non-zero PDSCH power may provide significant gain over zero power ABS.

Models and assumption similar to those used in 3GPP TR 36.814 are used. Configuration 4b, with 2 low power nodes per macro cell is used. Propagation model 1 is used. A file transfer traffic model is used. Traffic load is varied by the intensity of file arrivals. System models: LTE FDD in 10 MHz at 2 GHz band, antenna configuration DL 2×2, UL 1×2, macro power 46 dBm, pico power 30 dBm. A cell selection offset of 8 dB in favor of the pico base station is used. This results in 30% of the users being connected to the pico base stations. 50% of the frames are ABS.

In light of the above, it would be advantageous to enable transmission with reduced power in Almost Blank Subframes. However, for several reasons it is not obvious how such reduced transmission can be achieved.

First of all, to be able to demodulate the PDSCH, the terminal needs to know the difference in transmitted power, or energy, between the Reference Signals (RSs) and the resource elements carrying the PDSCH. In the current 3GPP standard 36.213, version 10.1.0, section 5.2, two parameters for this are used: $\rho_A$ for symbols carrying RS, and $\rho_B$ for symbols not carrying RS. These are in turn calculated based on the parameters $P_A$ and $P_B$. These parameters $P_A$ and $P_B$ are signaled to the terminal as two single values (pA and pB) in the PDSCH config Information Element, see 3GPP standard 36.331, version 10.1.0, section 6.3.2. It should be noted that the parameters $P_A$ and $P_B$, as currently specified, apply to all subframes, both ABS and non-ABS. Thus, it is currently not possible to use different power difference values for different subframes types, and therefore also not possible to transmit with reduced power on the PDSCH in Almost Blank Subframes.

Also to generate a Channel Quality Indicator (CQI), the wireless terminal needs to know the difference in transmitted power between the Reference Signals (RSs) and the resource elements carrying the PDSCH (denoted $\Delta_{offset}$ in 36.213). This power difference is currently signaled to the terminal as one single value per cell using the parameter nomPDSCH-RS-EPRE-Offset in the CQI-ReportConfig information elements, see 36.331.

The reference signals are transmitted with a constant power by the network node: "A UE may assume downlink cell-specific RS EPRE is constant across the downlink system bandwidth and constant across all subframes until different cell-specific RS power information is received."

It is hence currently not possible to vary the PDSCH power between subframes.

Prompted by the realization that significant performance improvements may indeed be achieved by enabling different PDSCH transmit power levels for different subframe types, this problem is solved according to some embodiments by using and signaling multiple, subframe-type specific RS-RE power offset values. Specifically, in addition to the offsets used for regular subframes, additional values for the Almost Blank Subframes are signalled. FIG. 1 c) illustrates a normal subframe and an Almost Blank Subframe (ABS) with $P_{PDSCH}$>0. In the last case a second $\Delta_{offset}$ is required.

Figure 4:
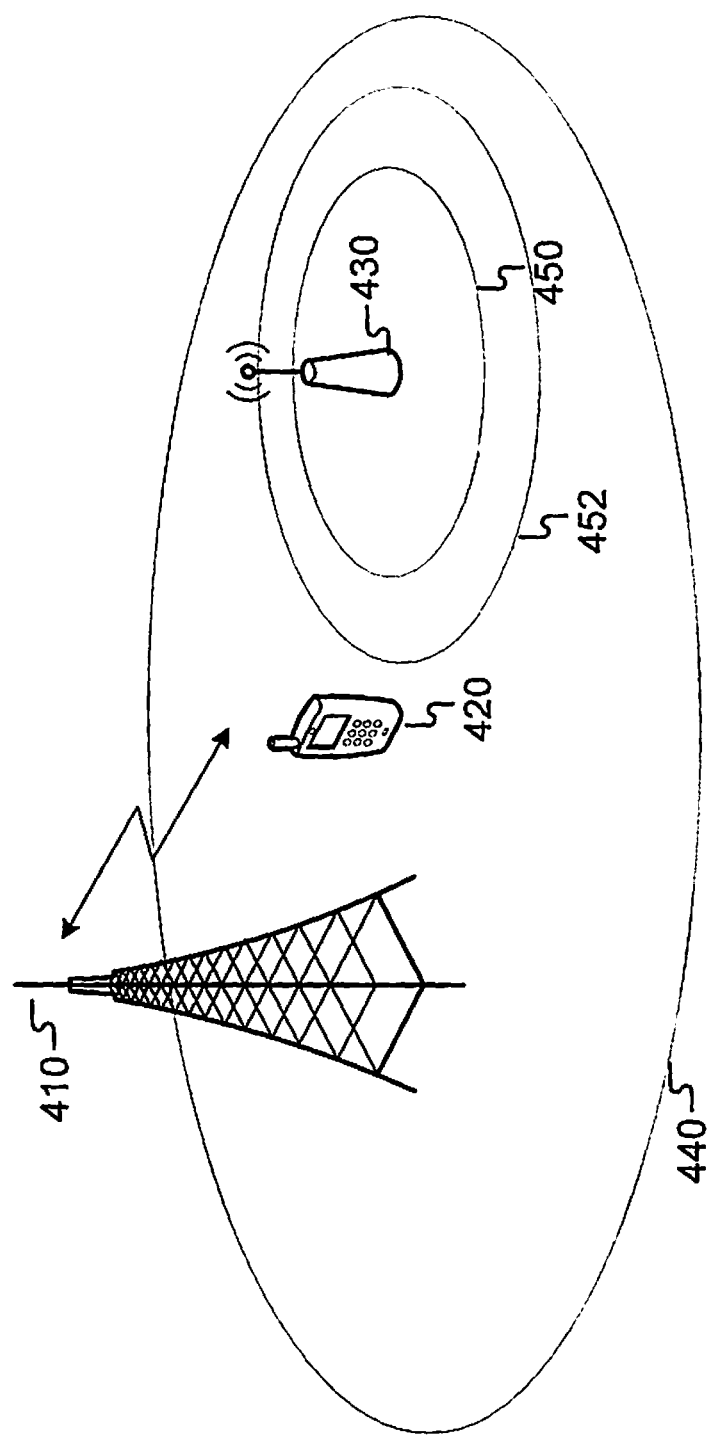
FIG. 4 is a schematic block diagram illustrating a scenario in a radio access network.

FIG. 4 illustrates an example scenario in which various embodiments of the invention may operate. A network node 410 serves a cell 440. A wireless terminal 420 is located within the coverage area of cell 440, and is connected to network node 410. It should be noted that network node 410 may serve more than one cell, e.g. three sector cells, and furthermore the network node 410 is not necessarily physically located within cell 440; the network node 410 may be equipped with distributed antennas, Remote Radio Heads (RRH) such that the physical location of the network node 410 is outside cell 440.

Within the coverage area of cell 440, there is also a second network node 430, which may for example be a low power node such as a micro or pico base station. In the following example, the second network node 430 will, without loss of generality, be referred to as low power node 430. The low power node 430 serves a cell 450, 452. The different coverage areas are due to cell extension using a Cell Selection Offset, CSO, with cell area 452 corresponding to the extended coverage range when CSO is applied. Although in the present example, cell 452 is completely surrounded by cell 440, it should be understood that the concepts presented here are equally applicable when the coverage areas of cells 452 and 440 only partially overlap.

A wireless terminal served by the low power node 430 and located in its extended range, i.e. the area between lines 450 and 452, is likely to be strongly interfered by transmissions from network node 410, in particular when network node 410 is a macro base station operating with higher transmission power. To mitigate the interference caused towards the low power node 430, the network node 410 may then transmit with reduced power on the PDSCH in certain subframes, i.e. it may use Almost Blank Subframes. According to various embodiments of the invention, the network node 410 uses a reduced power level to transmit data in the Almost Blank Subframes.

Figure 5:
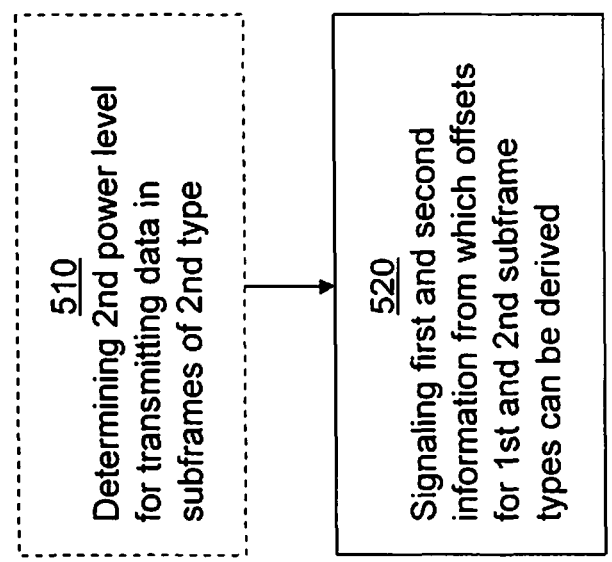
FIG. 5 is a flow chart illustrating a method according to some embodiments.

An example method at a network node 410 will now be described with reference to FIG. 2 and the flowchart of FIG. 5. The network node 410 is configured to use a first power level for transmitting data in normal subframes, i.e. non-ABS subframes, and to use a second power level, lower than the first power level but larger than zero, for transmitting data in ABS subframes. Although this example refers to non-ABS and ABS subframes, this should not be construed in a limiting sense. Generally speaking, the network node 410 may be configured to use a first power level for transmitting data in subframes of a first type, and to use a second power level for transmitting data in subframes of a second type. In particular variants, the second power level is lower than the first power level, and in further variants the second power level is larger than zero.

In an optional step 510, the network node 410 determines the power level for ABS subframes, or generally, the second power level. It is pointed out that it is not always necessary for the network node 410 to explicitly perform this step, as the second power level may for instance be signalled from another node, or be preconfigured in the network node 410.

There are different ways in which the network node 410 could determine the second power level, as will now be described In one variant, the second power level is determined based on the load of the network node 410. In a scenario where the network node 410 is highly loaded, e.g. >50% load, it is expected that reduced power ABS will be more advantageous than zero-power ABS, since this will allow some data to be transmitted, whereas if the load is lower, it may be more beneficial to transmit ABS with zero power so as to minimize interference to neighboring cells. Thus, in this variant, if the load of the network node 410 is above a predetermined threshold, reduced power is applied, i.e. the second power level is determined to be a value which is lower than the first power level, and larger than zero. It should be noted that the actual value of the second power level may also be determined based on load, i.e. if the load is higher, the second power level may also be set to a higher value. If the load is below the predetermined threshold, zero-power ABS is applied, i.e. the second power level is determined to be zero. The load may for example be measured based on downlink resource utilization.

In another variant, the second power level is determined based on the load of another node, e.g. second network node 130, or based on an overall system load, e.g. the load of several neighboring nodes. In a scenario where neighboring nodes are experiencing low load, the interference caused by network node 410 is less likely to cause any problems and therefore the network node 410 may apply a higher second power level in this case. On the other hand, if second network node 130 or other neighboring nodes are highly loaded, the network node 410 may apply zero-power ABS, i.e. set the second power level to zero, to avoid causing too much interference which would further reduce performance in the highly loaded neighbor cells.

In yet another variant, the second power level is determined such as to eliminate or reduce the amount of interference caused in the second cell 452 by transmissions from the network node 410. For instance, the second power level may be determined based on the cell selection offset of the second network node 430, and/or based on the first power level. In one particular example, the transmit power of the network node 410 for ABS, i.e. the second power level, is determined such as to achieve a Signal-to-Interference (SIR) value of 0, or close to 0, at the cell edge of cell 452. This may be realized by setting $$P_{macro\_abs} = P_{pico}(P_{macro\_normal} - P_{pico}) - CSO.$$

In the above formula, $P_{macro\_abs}$ corresponds to the second power level, $P_{macro\_normal}$ corresponds to the first power level, $P_{pico}$ is the transmit power of the second network node 430, and CSO is the cell selection offset applied by the second network node 430. The formula may be simplified to $P_{macro\_abs} = P_{macro\_normal} - CSO$. In other words, the second power level may be determined as the first power level minus the cell selection offset applied by the second network node 430. This variant is also possible to combine with the variant described above, such that if the load of the network node 410 is above a threshold value, the second power level is calculated based on one or more of the cell selection offset, the first power level, or the power level of the second network node 430, and if the load is below the threshold, the second power level is set to zero.

In step 520, the network node 410 signals to the wireless terminal 420, first information from which a power offset for subframes of the first type is derivable, and second information from which a power offset for subframes of the second type is derivable. The first power offset represents a relation between a power level for transmitting reference signals and the first power level, and the second power offset represents a relation between the power level for transmitting reference signals, and the second power level. As has been described above, these power offset values are needed by the wireless terminal 420 for correctly demodulating the data channel (PDSCH), and to be able to generate CQI reports.

There are various ways in which the offsets can be signalled to the wireless terminal 420. In a first variant, the first information is the power offset for subframes of the first type, e.g. non-ABS, and the second information is the power offset for subframes of the second type, e.g. ABS. Thus, both offsets are signalled directly. In a second variant, the first information comprises the power level for transmitting reference signal and the first power level, and the second information comprises the power level for transmitting reference signals and the second power level. In this variant, the power levels for RS and data are signalled, and the wireless terminal 420 uses these values to derive the offsets. In a third variant, the first information is the power offset for subframes of the first type, and the second information is the difference between the first power level and the second power level. The wireless terminal 420 then derives the power offset for subframes of the second type, e.g. ABS, from the first and second information.

It is pointed out that if a logarithmic power scale is used, the offset may be defined in terms of a difference between the first and second power levels. If a linear scale is used, the offset may instead be defined as a ratio between the power levels. Generally speaking, the offset represents a relationship between the first and second power levels.

Although in this example, it has been assumed that the network node 410 signals information to wireless terminal 420, the different offsets, or information from which the offsets can be derived, may also be signalled to another network node, such as a neighboring base station. This could e.g. be done using an extended "Relative Narrowband TX Power indication" message, see 3GPP TS 36.213, Section 5.2.1.

In some variants, $\Delta_{offset2}$, i.e. the offset for the second subframe type, is only applicable to C-RNTI, i.e. the offset information applies to UE-specific PDSCH information.

In this embodiment, the offsets, or information that can be used to derive the offsets, are signalled per subframe type. Specifically, one offset can be signalled for normal subframes, and another offset can be signalled for Almost Blank Subframes. This makes it possible to use a reduced transmission power in ABS.

It should be noted that the wireless terminal also needs to be informed of which type of subframe to expect at a certain transmission time interval, e.g. which subframes are ABS and which are normal subframes. This can be achieved by state-of-the-art mechanisms for signalling ABS subframe patterns, as defined in TS 36.300, section 16.1.5.

Figure 6:
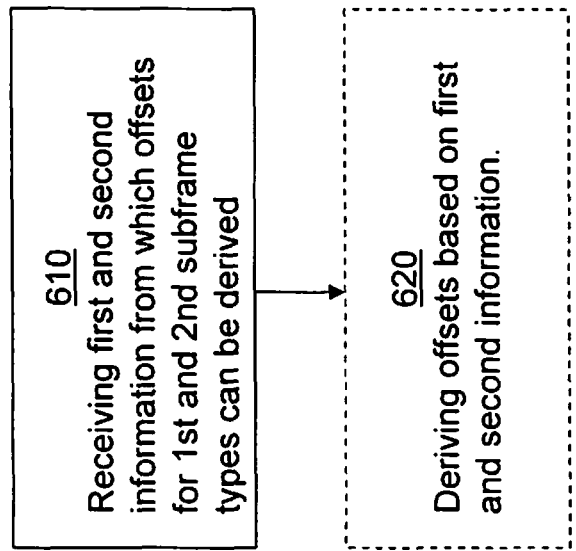
FIG. 6 is a flow chart illustrating a method according to some embodiments.

An example method at a wireless terminal will now be described with reference to FIG. 2 and the flowchart of FIG. 6. The example scenario is the same as described in connection with FIG. 5 above.

The wireless terminal 420 receives, 610, from the network node 410, first information from which a power offset for subframes of the first type is derivable, and second information from which a power offset for subframes of the second type is derivable. The first power offset represents a relation between a power level used by the network node 410 for transmitting reference signals and the first power level, and the second power offset represents a relation between the power level used by the network node 410 for transmitting reference signals, and the second power level.

In one variant, the first information is the power offset for subframes of the first type, and the second information is the power offset for subframes of the second type. Thus, the power offsets are received directly.

In other variants, at least one of the offsets is not received directly. Instead, the wireless terminal 420 derives, 620, the power offset for subframes of the second type, e.g. ABS, based on the first and/or second information. For instance, the first information may comprises the power level for transmitting reference signal and the first power level, and the second information may comprise the power level for transmitting reference signals and the second power level. In this case, the power offset for ABS can be derived based on the second information, i.e. power levels for RS and data. In another variant, the first information is the power offset for subframes of the first type, and wherein the second information is the difference between the first power level and the second power level. The wireless terminal 420 derives the offset for ABS based on the first and second information.

Furthermore, the wireless terminal 420 may apply the offsets for the different subframe types when demodulating data, and/or when generating CQI reports.

In some variants, $\Delta_{offset2}$, i.e. the offset for the second subframe type, is only applicable to C-RNTI, i.e. the offset information applies to UE-specific PDSCH information.

Particular embodiments of the invention may be realized by the following standard changes:

In 36.213, Section 5.2: change UE behaviour to consider multiple $\rho_A$ and $\rho_B$ depending on subframe type.

In 36.213, Section 7.2.3: change the UE behaviour to consider multiple $\Delta_{offset}$, depending on subframe type.

In 36.331, Section 6.3.2: define and include two pA and pB values in the PDSCH config Information Element.

In 36.331, Section 6.3.2: define and include two nomPDSCH-RS-EPRE-Offset values in the IE CQI-ReportConfig.

An example method in a network node, e.g. a base station, is described below.

1. BS decides on using Almost Blank Subframes and addition to normal subframes
2. BS decides on using power levels $P_{RS}$ for reference signals, $P_{normal}$ for PDSCH in normal subframes and $P_{ABS}$ for PDSCH in ABS
3. BS calculates offset$_{normal}$=$P_{normal}$/$P_{RS}$ and offset$_{ABS}$=$P_{ABS}$/$P_{RS}$
4. BS signals offset$_{normal}$ and offset$_{ABS}$ to UE.
5. BS signals offset$_{normal}$ offset$_{ABS}$ to other base stations.

An example method in a wireless terminal, e.g. an UE, is described below.

1. UE receives offset$_{normal}$ and offset$_{ABS}$
2. UE applies offset$_{normal}$ to normal subframes
3. UE applies offset$_{ABS}$ to normal ABS Note that the offsets may also be calculated using energy relations. In this case if PDSCH EPRE$_{normal}$ and PDSCH EPRE$_{ABS}$ are the transmitted Energies Per Resource Element (EPRE) for PDSCH in a normal subframe and in an ABS respectively, and RS EPRE is the transmitted Energy per Resource Element in a reference symbols, the offsets can be calculated as offset$_{normal}$=PDSCH EPRE/RS EPRE, and offset$_{ABS}$=PDSCH EPRE$_{ABS}$/RS EPRE.

Figure 7:
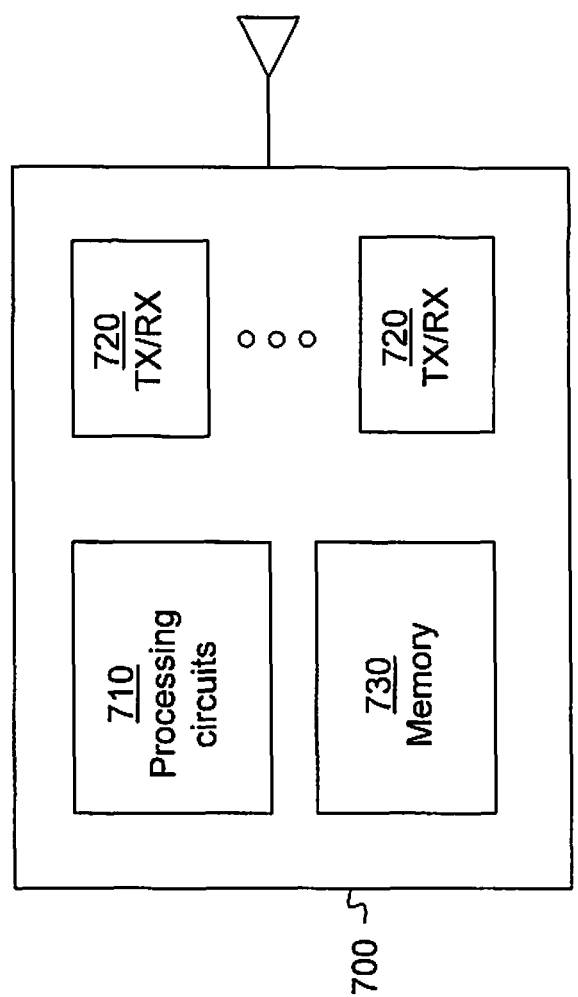
FIG. 7 is a schematic block diagram illustrating a network node.

FIG. 7 illustrates a network node 700 configured to perform the method according to embodiments described above. The network node 700 comprises a transmitter 720, a receiver 720, and a processing circuit 710. The network node 700 is configured to use a first power level for transmitting data in subframes of a first type, and to use a second power level for transmitting data in subframes of a second type. The processing circuit 710 is configured to signal, to a network entity connected to the network node 700, first information from which a power offset for subframes of the first type is derivable, and second information from which a power offset for subframes of the second type is derivable. The first power offset represents a relation between a power level for transmitting reference signals and the first power level, and the second power offset represents a relation between the power level for transmitting reference signals, and the second power level.

Although FIG. 7 shows exemplary components of network node 700, in other implementations, network node 700 may contain fewer, different, or additional components than depicted in FIG. 7. In still other implementations, one or more components of network node 700 may perform the tasks described as being performed by one or more other components of network node 700.

Figure 8:
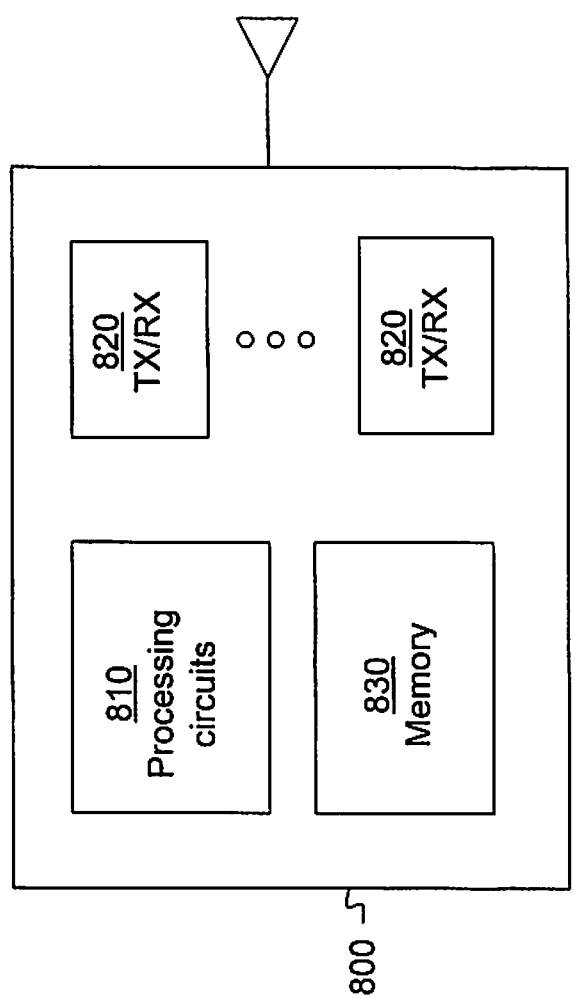
FIG. 8 is a schematic block diagram illustrating a wireless terminal.

FIG. 8 illustrates a wireless terminal 800 configured to perform the method according to embodiments described above. The wireless terminal 800 is connectable to a network node, which is configured to use a first power level for transmitting data in subframes of a first type, and to use a second power level for transmitting data in subframes of a second type. The wireless terminal 800 comprises a receiver 820 and a processing circuit 810. The processing circuit 810 is configured to receive, from the network node, first information from which a power offset for subframes of the first type is derivable, and second information from which a power offset for subframes of the second type is derivable. The first power offset represents a relation between a power level used by the network node for transmitting reference signals and the first power level, and the second power offset represents a relation between the power level used by the network node for transmitting reference signals, and the second power level.

Although FIG. 8 shows exemplary components of wireless terminal 800, in other implementations, wireless terminal 800 may contain fewer, different, or additional components than depicted in FIG. 8. In still other implementations, one or more components of wireless terminal 800 may perform the tasks described as being performed by one or more other components of wireless terminal 800.

It should be noted that although terminology from 3GPP LTE has been used in this disclosure to exemplify the invention, this should not be seen as limiting the scope of the invention to only the aforementioned system. Other wireless systems, including WCDMA, WiMax, UMB and GSM, may also benefit from exploiting the ideas covered within this disclosure.

When using the word "comprise" or "comprising" it shall be interpreted as non-limiting, i.e. meaning "consist at least of". It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The present invention is not limited to the above-describe preferred embodiments. Various alternatives, modifications and equivalents may be used. Therefore, the above embodiments should not be taken as limiting the scope of the invention, which is defined by the appended claims.

In particular, the present disclosure assumes that the transmit power for reference signals (RS) is the same for the first and second subframe types, e.g. ABS and non-ABS subframes. However, the same concepts apply in a similar way even if a different RS transmit power were to be used. The applied RS transmit power for different subframe types would then have to be preconfigured or directly or indirectly signalled to the network entity, e.g. wireless terminal 420.

It is further noted that the concepts presented here are not limited to only two subframe types. Although ABS and non-ABS subframes are described above, the invention equally applies to any subframe types, and any number of subframe types, wherein different transmit power levels are used.

What invention claimed is:
1. A method in a network node that serves a first cell having a first coverage area in a wi,reless network, the method comprising:
   transmitting reference signals for the first cell at a reference-signal power level;
   transmitting data in subframes of a first type at a first power level, said first power level being related to the reference-signal power level according to a first power offset;

transmitting data in at least some subframes of a second type at a second power level, said second power being related to the reference-signal power according to a second power offset;

wherein the subframes of the first type are normal subframes, which are normally used for data transmissions, and wherein the subframes of the second type are Almost Blank Subframes (ABS), and wherein transmitting data in at least some subframes of the second type at the second power level comprises using the ABS for data transmissions, in addition to using the normal subframes for data transmissions, when a load of the network node meets a threshold, and not using the ABS for data transmissions when the load of the network node does not meet the threshold.

2. The method of claim 1, wherein the second power level is lower than the first power level.

3. The method of claim 1, wherein the second power level is larger than zero.

4. The method of claim 1, further comprising determining the second power level based on the load of the network node.

5. The method of claim 4, further comprising:
if the load of the network node is above a predetermined threshold, determining the second power level to be a value which is lower than the first power level, and larger than zero; and
determining the second power level to be zero if the load of the network node is below the predetermined threshold.

6. The method of claim 1, wherein the first coverage area, which at least partially overlaps a second coverage area of a second cell served by a second network node, the method further comprising:
determining the second power level such as to eliminate or reduce the amount of interference caused in the second cell by transmissions from the network node.

7. The method of claim 6, wherein the second network node applies a cell selection offset, CSO, for the second cell, and wherein the second power level is determined based on the cell selection offset and/or the first power level.

8. The method of claim 7, wherein the second power level is determined as the first power level minus the cell selection offset.

9. A method in a wireless terminal, wherein the wireless terminal is connected to a network node, and wherein the network node is configured to use a first power level for transmitting data in subframes of a first type, and to use a second power level for transmitting data in subframes of a second type, the method comprising:
receiving reference signals for a first cell that are transmitted by the network node at a reference-signal power level;
receiving data in subframes of the first type at the first power level, said first power level being related to the reference signal power level according to a first power offset;
receiving data in at least some subframes of the second type at the second power level, said second power level being related to the reference-signal power according to a second power offset;

using the first and second power offsets for at least one:
demodulating data received in the first and second types of subframes; and
generating channel quality information for reporting to the network node.

10. The method of claim 9, wherein the second power level is lower than the first power level.

11. The method of claim 9, wherein the second power level is larger than zero.

12. The method of claim 9, wherein the network node is an evolved NodeB, eNB, and wherein the wireless terminal is a user equipment, UE.

13. A network node configured to serve a first cell having a first coverage area in a wireless network wherein the network node comprises a transmitter, a receiver, and a processing circuit, and wherein the processing circuit is configured to:
transmit, via the transmitter, reference signals for the first cell at a reference-signal power level;
transmit, via the transmitter, data in subframes of a first type at a first power level, said first power level being related to the reference-signal power level according to a first power offset; and
transmit, via the transmitter, data in at least some subframes of a second type at a second power level, said second power level being related to the reference-signal power according to a second power offset;
wherein the subframes of the first type are normal subframes, which are normally used for data transmissions, and wherein the subframes of the second type are Almost Blank Subframes (ABS), and wherein transmitting data in at least some subframes of the second type at the second power level comprises using the ABS for data transmissions, in addition to using the normal subframes for data transmissions, when a load of the network node meets a threshold, and not using the ABS for data transmissions when the load of the network node does not meet the threshold.

14. A wireless terminal, wherein the wireless terminal is connectable to a network node which is configured to use a first power level for transmitting data in subframes of a first type, and to use a second power level for transmitting data in subframes of a second type, and wherein the wireless terminal comprises a receiver and a processing circuit, wherein the processing circuit is configured to:
receive reference signals for a first cell that are transmitted by the network node at a reference-signal power level;
receive data in subframes of the first type at the first power level, said first power level being related to the reference signal power level according to a first power offset;
receive data in at least some subframes of the second type at the second power level, said second power level being related to the reference-signal power according to a second power offset;
use the first and second power offsets for at least one of:
demodulating data received in the first and second types of subframes; and
generating channel quality information for reporting to the network node.

* * * * *